United States Patent
Wareus et al.

(10) Patent No.: US 12,443,396 B2
(45) Date of Patent: Oct. 14, 2025

(54) IDENTIFICATION OF RELEVANT CODE BLOCK WITHIN RELEVANT SOFTWARE PACKAGE FOR A QUERY

(71) Applicant: MICRO FOCUS LLC, Santa Clara, CA (US)

(72) Inventors: Carl Emil Orm Wareus, Malmo (SE); Nils Valdemar Barr Zeilon, Kista (SE); Per Filip Heden, Kista (SE)

(73) Assignee: Micro Focus LLC, Santa Clara, CA (US)

( * ) Notice: Subject to any disclaimer, the term of this patent is extended or adjusted under 35 U.S.C. 154(b) by 72 days.

(21) Appl. No.: 17/993,508

(22) Filed: Nov. 23, 2022

(65) Prior Publication Data

US 2024/0168728 A1 May 23, 2024

(51) Int. Cl.
*G06F 8/36* (2018.01)
*G06F 8/73* (2018.01)
*G06F 16/2455* (2019.01)
*G06F 16/28* (2019.01)

(52) U.S. Cl.
CPC ............ *G06F 8/36* (2013.01); *G06F 8/73* (2013.01); *G06F 16/2455* (2019.01); *G06F 16/285* (2019.01)

(58) Field of Classification Search
CPC ...... G06F 8/34–36; G06F 8/73; G06F 16/285; G06F 16/2455
See application file for complete search history.

(56) References Cited

U.S. PATENT DOCUMENTS

| | | | |
|---|---|---|---|
| 11,604,626 B1* | 3/2023 | Sawant | G06F 8/75 |
| 11,887,736 B1* | 1/2024 | Norgeot | G16H 15/00 |
| 2016/0063062 A1* | 3/2016 | Yahav | G06F 16/90335 |
| | | | 707/769 |
| 2020/0183681 A1* | 6/2020 | Ramsl | G06F 40/30 |
| 2021/0056100 A1* | 2/2021 | Steinhauser | G06F 16/248 |
| 2022/0308845 A1* | 9/2022 | Krishnamoorthy | G06F 8/36 |
| 2023/0062297 A1* | 3/2023 | Eloul | G06F 8/36 |
| 2023/0224493 A1* | 7/2023 | Foley | G16H 50/20 |
| | | | 375/240.12 |

FOREIGN PATENT DOCUMENTS

CN 104866504 B * 7/2018

OTHER PUBLICATIONS

Husain, Hamel et al. "CodeSearchNet Challenge: Evaluating the State of Semantic Code Search." ArXiv abs/1909.09436 (2019).

(Continued)

*Primary Examiner* — Ziaul A Chowdhury
(74) *Attorney, Agent, or Firm* — Sheridan Ross P.C.

(57) ABSTRACT

A database stores, for each of a number of software packages, a software package embedding representing the software package. The database stores, for each software package, code block embeddings respectively representing code blocks of the software package. The database stores, for each software package, functionality embeddings respectively representing functionality clusters into which the code block embeddings representing the code blocks of the software package have been clustered. A query embedding representing a query is generated, and used to query the database to identify a relevant code block within a relevant software package for the query.

15 Claims, 8 Drawing Sheets

(56) References Cited

OTHER PUBLICATIONS

Feng, Zhangyin, et al. "Codebert: A pre-trained model for programming and natural languages." arXiv preprint arXiv:2002.08155 (2020).
Liu, Shangqing, et al. "GraphSearchNet: Enhancing GNNs via Capturing Global Dependency for Semantic Code Search". (2021).
Egor Bogomolov, Yaroslav Golubev, Artyom Lobanov, Vladimir Kovalenko, and Timofey Bryksin. Sosed: A Tool for Finding Similar Software Projects, p. 1316-1320. Association for Computing Machinery, New York, NY, USA, 2020.
Daya Guo, Shuai Lu, Nan Duan, YanlinWang, Ming Zhou, and Jian Yin. Unixcoder: Unified cross-modal pre-training for code representation. arXiv preprint arXiv:2203.03850, 2022.
Julia Hirschberg and Christopher D. Manning. Advances in natural language processing. Science, 349(6245):261-266, 2015.
W.C. Lim. Effects of reuse on quality, productivity, and economics. IEEE Software, 11(5):23-30, 1994.
Collin McMillan, Mark Grechanik, Denys Poshyvanyk, Chen Fu, and Qing Xie. Exemplar: A source code search engine for finding highly relevant applications. IEEE Transactions on Software Engineering, 38(5):1069-1087, 2012.
G. Salton and M. E. Lesk. The smart automatic document retrieval systems-an illustration. Commun. ACM, 8(6):391-398, Jun. 1965.
Susan Elliott Sim, Medha Umarji, Sukanya Ratanotayanon, and Cristina V. Lopes. How well do search engines support code retrieval on the web? ACM Trans. Softw. Eng. Methodol., 21(1), Dec. 2011.
Vijayan Sugumaran and Veda C. Storey. A semantic-based approach to component retrieval. SIGMIS Database, 34(3):8-24, Aug. 2003.
About github. https://github.com/about. Accessed: Sep. 3, 2022.

\* cited by examiner

IDENTIFICATION OF RELEVANT CODE BLOCK WITHIN RELEVANT SOFTWARE PACKAGE FOR A QUERY

BACKGROUND

Modern software development can reuse and extend existing software packages to reduce development time, as well as to improve quality and reduce future maintenance needs. The terminology "software packages" as used herein can refer to source code groups, packages, libraries, and collections of code blocks. The terminology "code blocks" as used herein can in turn refer to functions, classes, objects and methods that can be individually reused. A code block includes the source code in a computer programming language that can be interpreted or compiled for execution by a computing device. A code block may also have a documentation string, or "docstring," which is a description of the code block in a natural (e.g., human) language, such as English.

DETAILED DESCRIPTION

Code blocks of software packages, which include source code and which may also include documentation strings, can be individually reused in a software project undergoing development. Software packages can include publicly available open source packages, as well as publicly available commercial packages and privately available packages. Examples of software packages include those available in repositories on platforms including the Stack Overflow platform at www.stackoverflow.co, and the GitHub platform at www.github.com, among others. The code blocks of a software package may have source code in a variety of different programming languages, including Go, C++, Ruby, PHP, Python, JavaScript, and Java, among others.

Because of the sheer number of different software packages that are available, identifying a relevant code block within a relevant software package for a software project being developed can be difficult. To assist developers in identifying relevant code blocks, semantic code search and neural code search techniques have been developed. Such techniques permit natural language queries to be run against databases of code blocks of software packages, in order to identify code blocks that may be suitable for reuse within software projects being developed.

However, existing semantic and neural code search techniques may identify a relevant code block but within an irrelevant software package for a given software project. The software package may pertain to a different domain than the software project being developed, for instance, and thus not suitable for reuse within the given project currently being developed. Similarly, the software package may be too project-specific or pertain to a project that is too large and not suitable for reuse within the project currently undergoing development.

Furthermore, existing semantic and neural code search techniques may require that the natural language queries be accurate and specific, which assumes that developers know exactly what the type of code blocks for which they are looking. The techniques, in other words, do not take into account the entirety of all the code blocks of a given software package as a whole when identifying a relevant code block. Rather, the code blocks of all the software packages are considered on a per-code block basis, without consideration of the packages of which they are a part.

Semantic and neural code search techniques may further have limited scalability. The number of code blocks a given software package may have can be quite large. As the number of software packages that can be searched increases, the resulting total number of code blocks may present a performance problem for effective searching. That is, even with modern computing systems having large amounts of memory and large numbers of fast processors, searching the code blocks may be effectively intractable using existing semantic and neural code search techniques.

Techniques described herein ameliorate these and other issues. The techniques effectively extend semantic and neural code search techniques so that the software packages of which the code blocks are a part are considered during the search process. More specifically, the code blocks of a software package are in effect clustered within functionality clusters, so that code blocks providing similar functionality are part of the same cluster. The initial part of the search considers just these clusters, improving accuracy and performance, and permitting scalability to large numbers of packages.

Figure 1:
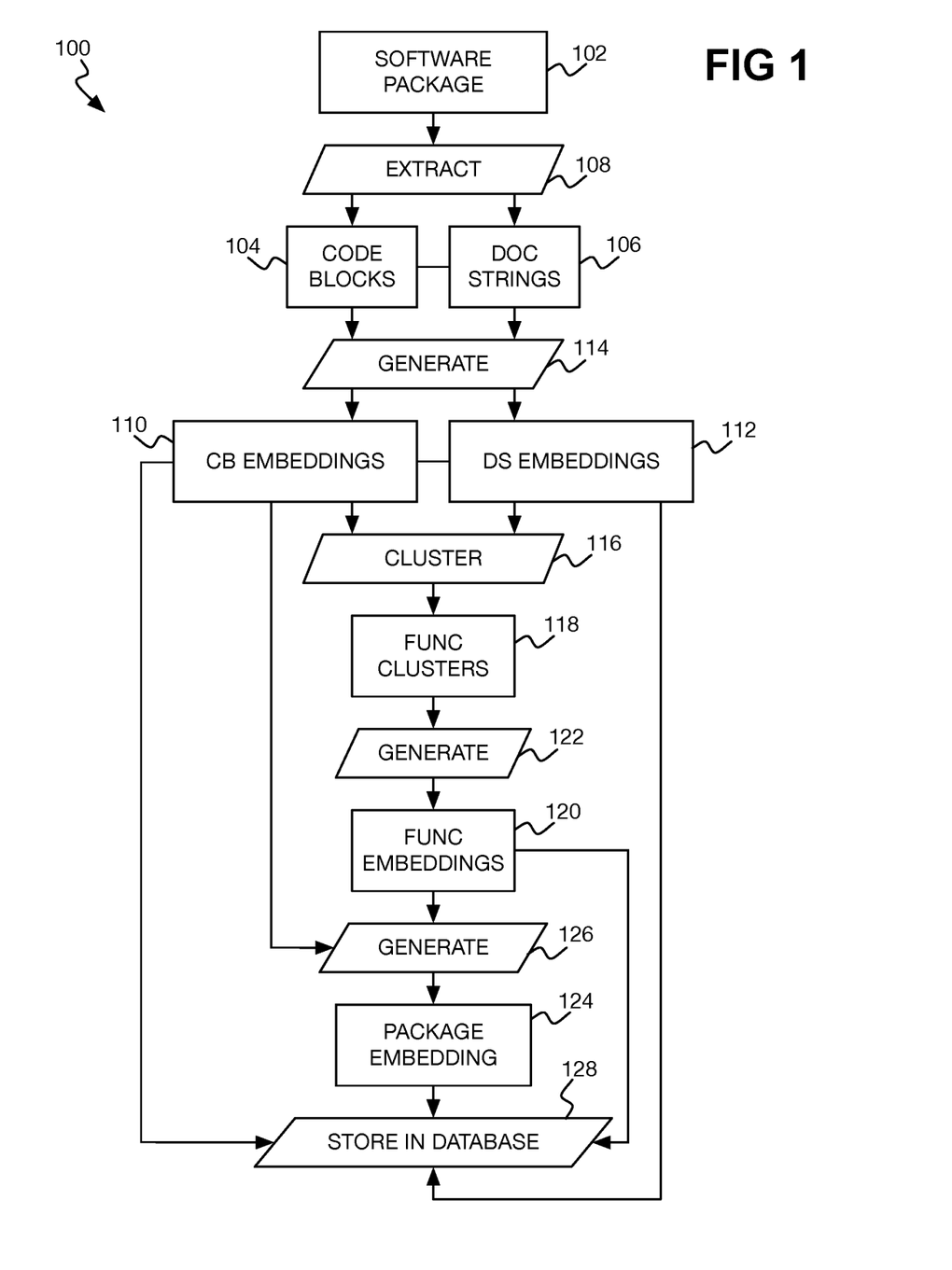
FIG. 1 is a diagram of an example process for generating embeddings for a software package that can be subsequently searched to identify a relevant code block of a relevant software package for a query.

FIG. 1 shows an example process 100 for generating a queryable database that can be subsequently searched to identify a relevant code block of a relevant software package for a given query. The process 100, as well as other processes described herein, may be performed by a processor executing program code stored on a non-transitory computer-readable data storage medium. The process 100 is described in relation to a software package 102. However, the process 100 is performed for each software package 102 that is to be represented within the database for searching purposes.

Code blocks 104, as well as their documentation strings 106 insofar as the code blocks 104 have such documentation strings 106, are extracted (108) from the software package 102. A code block 104 includes source code in a computer programming language to perform a particular function. A code block 104 may or may not have an associated documentation string 106 that in a natural language such as English describes the function of the code block 104. The code blocks 104 and their documentation strings 106 when present may be extracted in a number of different ways.

Most generally, the software package 102 can be parsed for its constituent objects, functions, classes, methods, and so on, to extract the code blocks 104. For example, a given programming language defines syntax and semantics by which the source code of individual code blocks 104 of a software package 102 in that programming language can be identified. Furthermore, a programming language defines how non-source code natural language comments are specified within the source code. Comments immediately preceding or at the beginning of a code block 104 within the software package 102, if present, can be identified as the documentation string associated with that code block 104.

In one implementation, an existing dataset of code blocks 104 of a large number of software packages 102 in a variety of different programming languages may be leveraged to extract the code blocks 104 and any associated documentation strings 106 for each package 102. For example, the CodeSearchNet Corpus available at github.com/github/CodeSearchNet organizes code blocks 104 over rows of a table. The columns of the table specify various information for each code block 104.

The columns can, for instance, specify for each code block 104 the software package 102 of which the block 104 is a part, the source code itself (i.e., a string specifying the function, method, object, or class that constitutes the code block 104), and the block's 104 documentation string 106 if present. Therefore, extraction of the code blocks 104 of each software package 102 can include retrieving the dataset, and for each row, extracting the source code column as a code block 104, and, if present, the documentation string column as the documentation string 106 for this code block 104.

Once the code blocks 104 and their documentation strings 106 insofar as present have been extracted, code block embeddings 110 and documentation string embeddings 112 are respectively generated (114) for the code blocks and the documentation strings 106. Each code block 104 has a corresponding code block embedding 110. For each code block 104 having an associated documentation string 106, the documentation string 106 likewise has a corresponding documentation string embedding 112.

The code block embedding 110 of a code block 104 is a representation of the source code of the code block 104. The embedding 110 may be a vectorized representation of the code block 104, and thus may be a vector of relevant programming language syntax present in the source code to encode the code block 104 as the vector. The embedding 110 may be generated using a code machine learning model that has been trained to generate a vectorized representation for input code blocks 104 in a given programming language.

An example of such a model is the UniXCoder model described in D. Guo et al., "UniXcoder: Unified Cross-Modal Pre-training for Code Representation" (2022), arXiv: 2203.03850, where the model has been trained on code block training data in a specific programming language. Another example of such a model is one employing the Transformer neural network architecture, A. Vaswani, "Attention Is All You Need" (2017), arXiv:1706.03762, where the model has similarly been trained on code block training data in a specific program language.

The documentation string embedding 112 of a documentation string 106 is likewise a representation of the natural language of the documentation string 106. The embedding 112 may similarly be a vectorized representation of the documentation string 106, and thus may be a vector of the natural language of the string 106 to encode the document string 106 as a vector. The embedding 112 may be generated using a language machine learning model trained to generate a vectorized representation for input documentation strings 106 in a given natural language. The referenced UniXCoder or Transform architecture model may be used here as well, but where the model has been trained on documentation string training data in a specific natural language.

The code model used to generate the code block embeddings 110 and the language model used to generate the documentation string embeddings 112 may be trained so that for a given code block 104 having a given documentation string 106, the embedding 110 returned by the code block is similar if not identical to the embedding 112 returned by the language model. For example, one instance of the UniXCoder model may be trained as the code model at the same time as another instance of the UniXCoder model is trained as the language model. The model instances are thus cross trained to respectively generate similar code block and documentation string embeddings 110 and 112 for a given code block 104 having a given documentation string 106.

The code block embeddings 110 and the documentation string embeddings 112 are clustered (116) into functionality clusters 118. One general approach is described in relation to FIG. 1, whereas two other general approaches, and a particular clustering technique that can be used with any approach, are described later in the detailed description. In the general approach of FIG. 1, the embeddings 110 and 112 are clustered into the same functionality clusters 118. A given functionality cluster 118 may thus include code block embeddings 110 and/or documentation string embeddings 112.

The code block embeddings 110 of a functionality cluster 118 represent or encode code blocks 104 having similar functionality within the software package 102. The documentation string embeddings 112 of a functionality cluster 118 similarly represent documentation strings 106 of code blocks 104 having similar functionality within the software package 102. Therefore, the code blocks 104 are effectively clustered into clusters 118 by functionality, using the embeddings 110 of the code blocks 104 themselves and the embeddings 112 of their documentation strings 106 when available.

Functionality embeddings 120 are then respectively generated (122) for the functionality clusters 118. Each functionality cluster 118 has a corresponding functionality embedding 120. The functionality embedding 120 for a functionality cluster 118 may be generated by combining the code block embeddings 110 and the documentation string embeddings 112 of the cluster 118. For example, the vector mean of the vectors of these embeddings 110 and 112 may be computed as the functionality embedding 120. That is, for each vector dimension, the values of that dimension within the vectors of the embeddings 110 and 112 are averaged to generate the corresponding dimension of the vector of the functionality embedding 120.

A software package embedding 124 for the software package 102 as a whole is also generated (126), using either the functionality embeddings 120 of the functionality clusters 118 or using the code block embeddings 110 of the code blocks 104 of the software package 102. The embeddings 120 or the embeddings 110 may be combined to generate the software package embedding 124. For example, the vector mean of the vectors of the functionality embeddings 120 or the vector mean of the vectors of the code block embeddings 110 may be generated to generate the software package embedding 124.

The software package embedding 124 for the software package 102, the code block embeddings 110 for the code blocks 104 of the package 102, the documentation string embeddings 112 for the documentation strings 106 of the code blocks 104, and the functionality embeddings 120 of the functionality clusters 118 into which the embeddings 110 and 112 have been clustered are then stored in a database (128). As noted, the process 100 is performed for each of a number of software packages 102. Therefore, embeddings 110, 112, 120, and 124 are stored for each package 102 within the database.

In the process 100, the code block embeddings 110 and the documentation string embeddings 112 are clustered at the same time into functionality clusters 118, as one general clustering approach. However, in other implementations, other general clustering approaches can be used to cluster the code block embeddings 110 and the documentation string embeddings 112 into functionality clusters 118. Two such approaches are now described in detail.

Figure 2A:
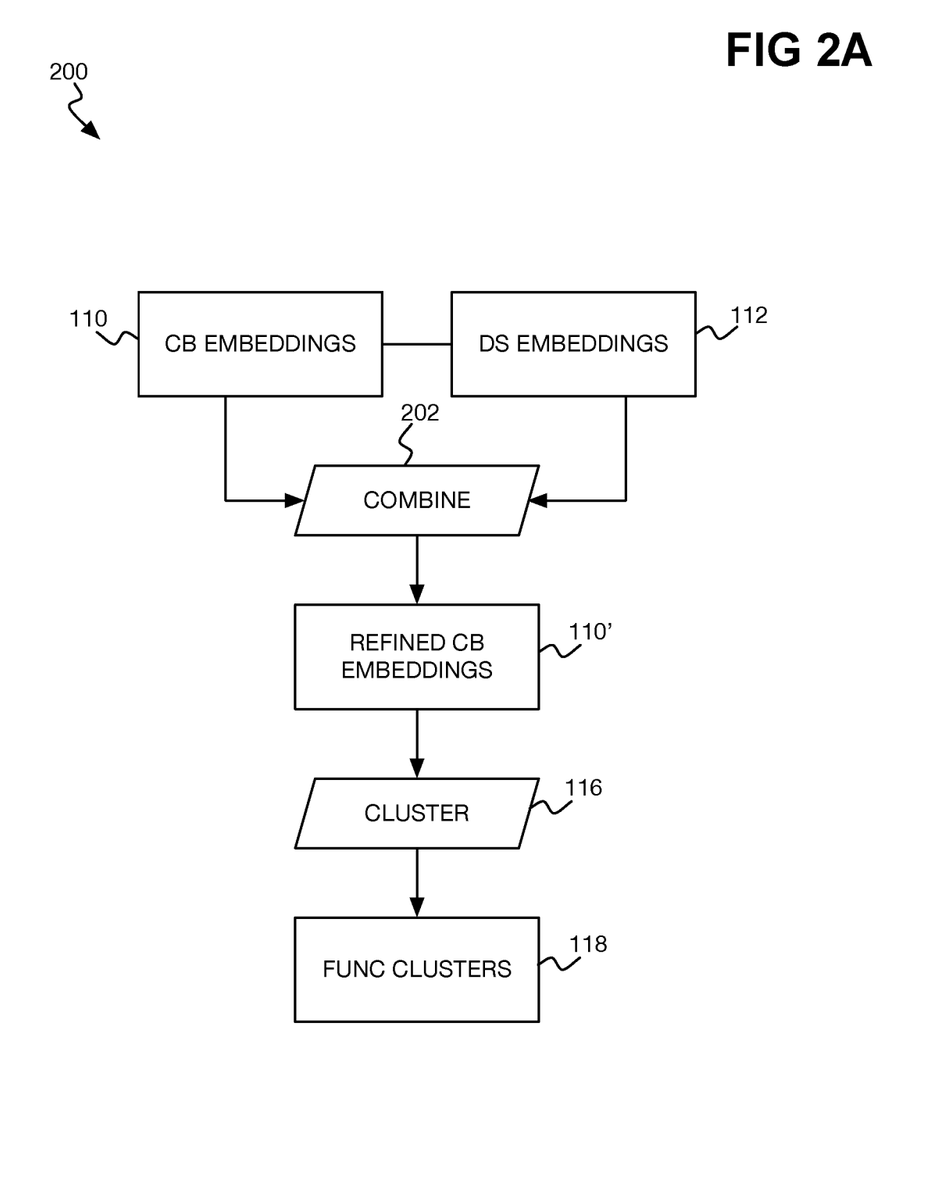
FIGS. 2A and 2B are diagrams of other different example processes that can be used in the process of FIG. 1, as to how code blocks having documentation string can have their embeddings clustered.

FIG. 2A shows a process 200 for another general clustering approach by which to cluster the code block embeddings 110 and the documentation string embeddings 112 into functionality clusters 118. Specifically, the code block embedding 110 for each code block 104 having a documentation string 106 is combined (202) with the documentation string embedding 112 of the documentation string 106 of that code block 104 to generate a refined code block embedding 110'. For example, the vector mean of the code block embedding 110 of a code block 104 and the documentation string embedding 112 of the documentation string 106 for that code block 104 may be computed as the refined code block embedding 110'.

The refined code block embeddings 110' of code blocks 104 having documentation strings 106 (along with the code block embeddings 110 of code blocks 104 that do not have documentation strings 106) are then clustered (116) into functionality clusters 118 as before. Therefore, in the clustering approach of the process 200, the documentation string embeddings 112 themselves are not directly clustered into the functionality clusters 118. Rather, the documentation string embeddings 112 are combined with their respective code block embeddings 110 to generate refined code block embeddings 110' that are directly clustered.

Figure 2B:
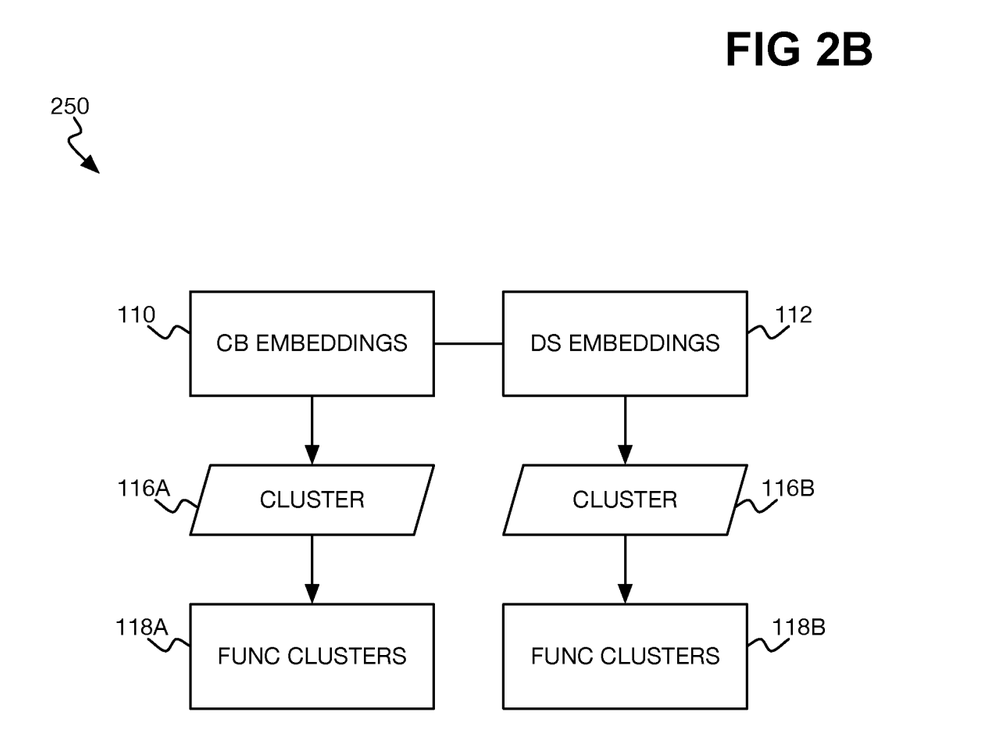

FIG. 2B shows a process 250 for a second general clustering approach by which to cluster the code block embeddings 110 and the documentation string embeddings 112 into functionality clusters 118. Specifically, the code block embeddings 110 are clustered (116A) into functionality clusters 118A, and the documentation string embeddings 110 are separately clustered (116B) into additional functionality clusters 118B. Therefore, each cluster 118A includes only code block embeddings 110, and each cluster 118B includes only documentation string embeddings 112. The functionality clusters 118 as a whole includes the set of clusters 118A and the set of clusters 118B.

Figure 3:
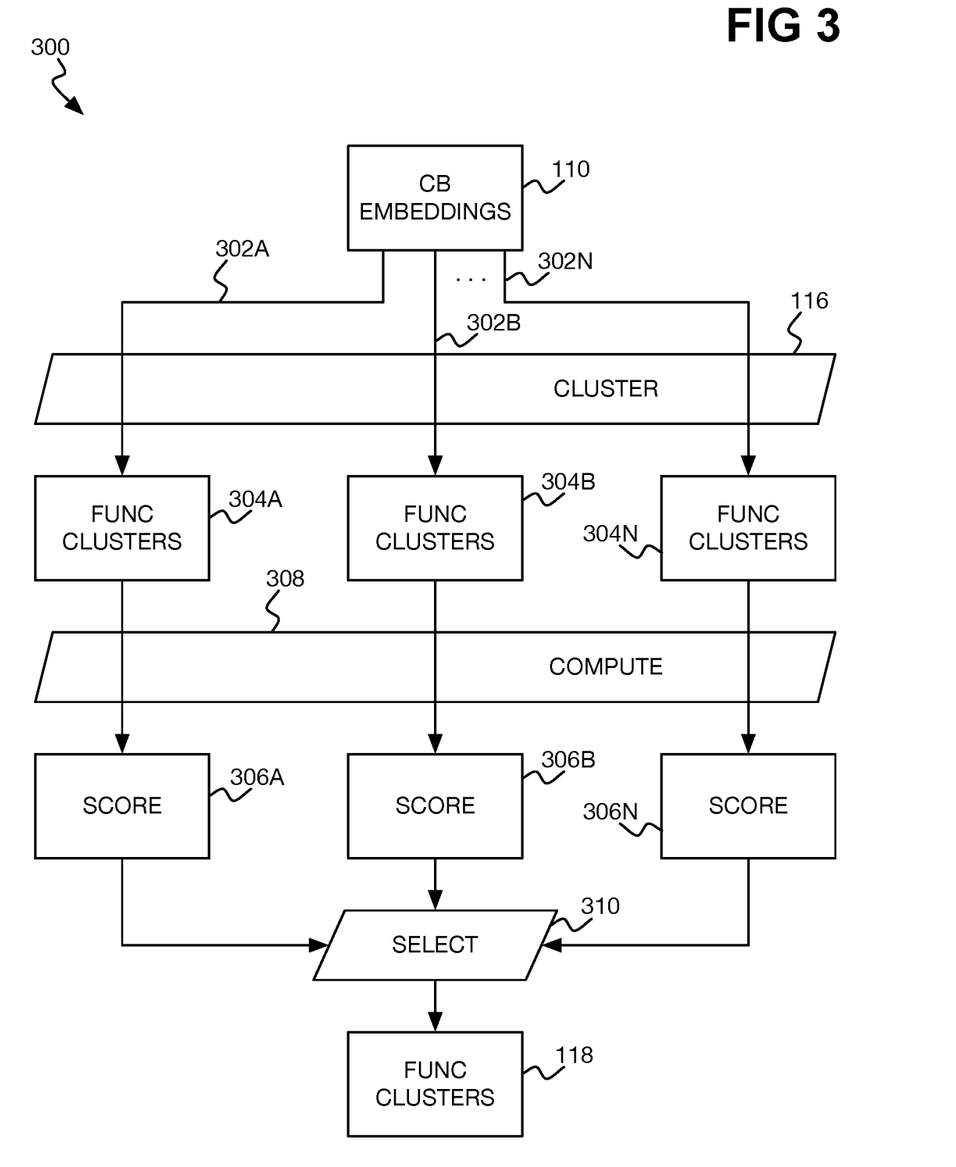
FIG. 3 is a diagram of an example process that can be used in the process of FIG. 1 and in accordance with which the processes of FIGS. 2A and 2B can be adapted, as to how in particular code blocks can having their embeddings clustered.

FIG. 3 shows process 300 for a particular clustering technique that can be used in conjunction with (i.e., to implement) the general clustering approach of FIG. 1, 2A, or 2B. The process 300 for descriptive clarity and convenience is described just in relation to code block embeddings 110. In the process 100 of FIG. 1, however, the process 300 is performed in relation to the code block embeddings 110 and the documentation string embeddings 112 together. In the process 200 of FIG. 2A, the process 300 is performed in relation to the refined code block embeddings 110' (and the code block embeddings 110 of blocks 104 that do not have documentation strings 106). In the process 250 of FIG. 2B, the process 300 is performed in relation to the code block embeddings 110 and the documentation string embeddings 112 separately.

In the process 300, the embeddings 110 are clustered (116) a number of times 302A, 302B, ..., 302N to yield respective sets 304A, 304B, ..., 304N of functionality clusters. Each time 302A, 302B, ..., 302N the embeddings are clustered, the same or different clustering algorithm may be used. Examples of different clustering algorithms include K-means clustering, Ward clustering, and OPTICS clustering. Furthermore, particularly when the same clustering algorithm is used one or multiple of the times 302A, 302B, ..., 302N, the embeddings 110 may be clustered in a different number of functionality clusters in the respective sets 304A, 304B, ..., 304N.

For example, a given clustering algorithm may require that the number of functionality clusters into which the embeddings 110 are clustered be prespecified. Therefore, the first time 302A the embeddings 110 are clustered, there may be A functionality clusters in the respective set 304A. The second time 302B the embeddings 110 are clustered, there may be B≠A functionality clusters in the respective set 304B. The last time 302N the embeddings 110 are clustered, there may be N≠B≠A functionality clusters in the respective set 304N.

For each set 304A, 304B, ..., 304N of functionality clusters, a respective score 306A, 306B, ..., 306N is computed (308) to evaluate how well the respective time 302A, 302B, ..., 302N has clustered the embeddings 110. As one example, the silhouette score of each set 304A, 304B, ..., 304N may be computed. The functionality clusters 118 used in the process 100 of FIG. 1 are then selected (310) as the set 304A, 304B, ..., 304N having the highest (or lowest) score. Other of the sets 304A, 304B, ..., 304N that do not have the highest (or lowest) score, in other words, are discarded, and not subsequently used in the process 100.

Particular clustering techniques other than that of FIG. 2A may instead be used. For example, clustering may be performed just once, instead of multiple times 302A, 302B, ..., 302N. In this case, if the clustering algorithm being used requires pre-specification of the number of functionality clusters 118, the optimal number of clusters 118 may be determined using the Elbow method, particularly in the case of the K-means clustering algorithm.

Figure 4:
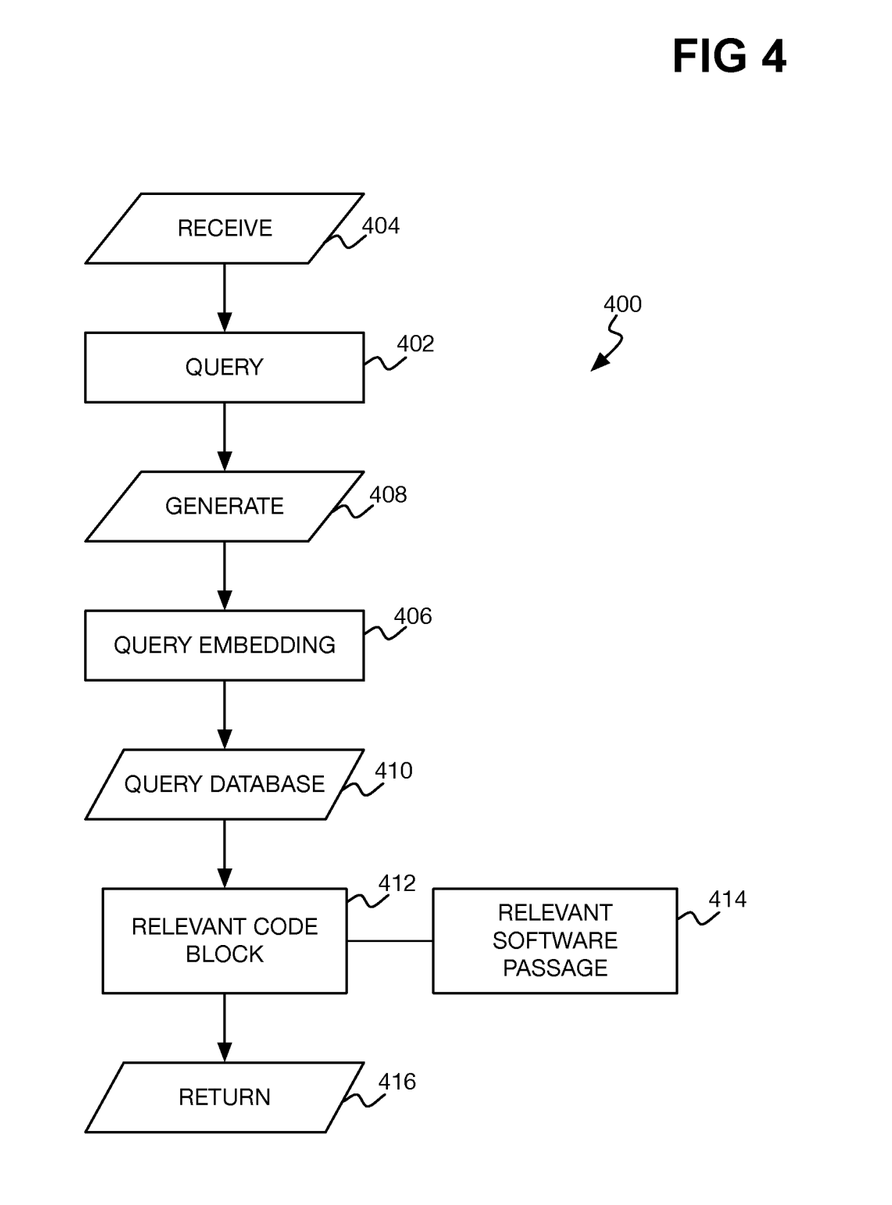
FIG. 4 is a diagram of an example process for identifying a relevant code block of a relevant software package for a query.

FIG. 4 shows an example process 400 for searching a database constructed in accordance with the process 100 of FIG. 1. As noted, the database includes, for each software package 102 represented in the database, a software package embedding 124, functionality embeddings 120, and code block embeddings 110, and can also include documentation string embeddings 112. A natural language query 402 is received (404), which specifies or describes the desired code block to be identified. A developer or other user, for instance, may provide the query.

A query embedding 406 for the query 402 is generated (408). The query embedding 406 is generated in the same manner in which the documentation string embeddings 112 were generated from respective document strings 106 for a software package 102 when populating the database in the process of FIG. 1. The embedding 406 may thus be a vectorized representation of the query 402, and therefore may be a vector of the natural language of the query 402 to encode the query 402 as a vector.

The database is then queried using the query embedding 406 (410) to identify a relevant code block 412 of a relevant software package 414 matching the query 402. How the database of embeddings 124, 120, 110, and/or 112 for each software package 102 is queried is subsequently described in the detailed description. The relevant code block 412 of the relevant software package 414 is then returned (416) in satisfaction of the query 402.

Figure 5A:
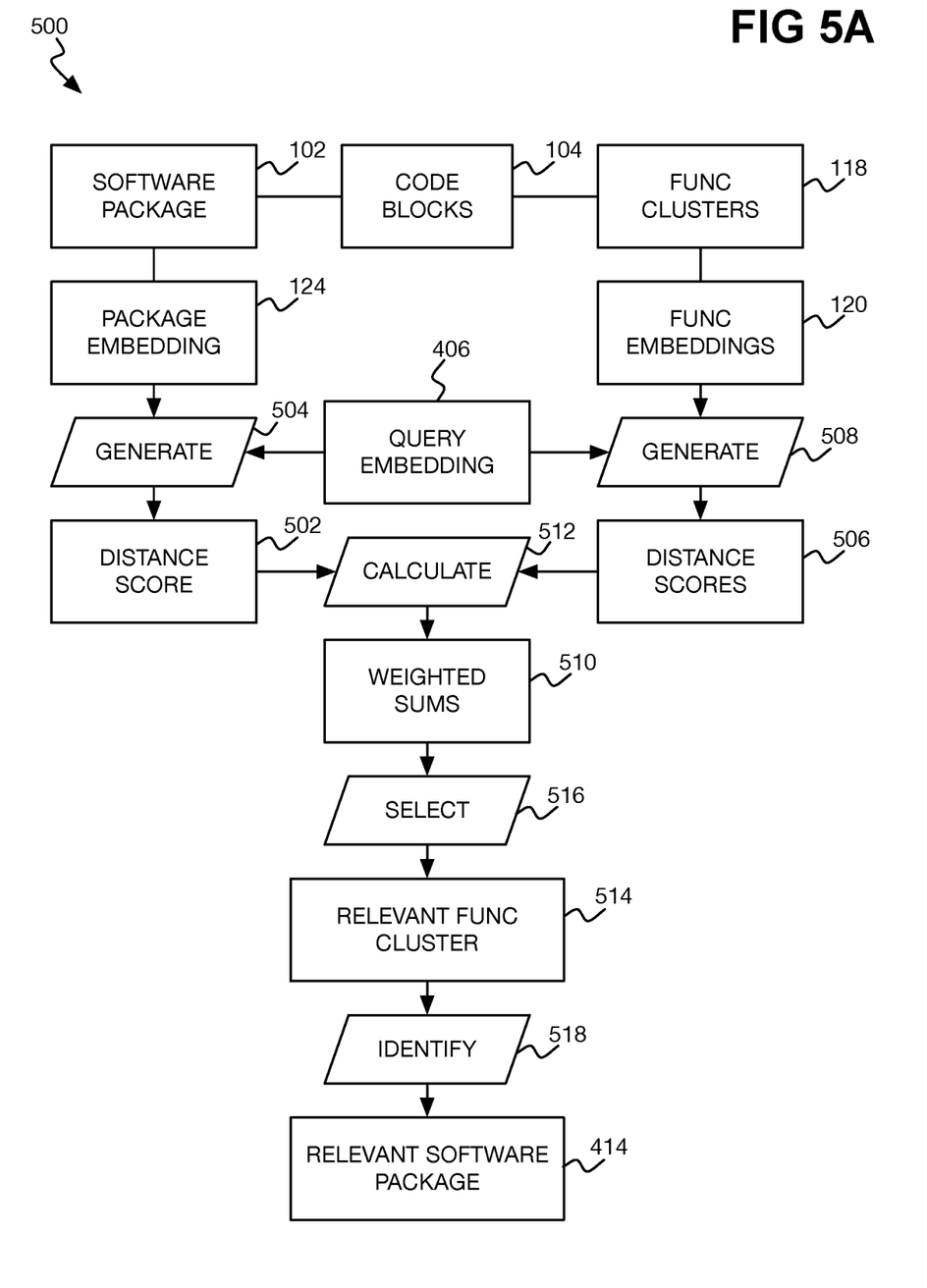
FIGS. 5A and 5B are diagrams of example process that can be used in the process of FIG. 4, as to how a query embedding for a query can be used to identify a relevant code block of a relevant software package.

FIG. 5A shows a process 500 for querying the database using the query embedding 406 to initially identify the relevant software package 414 that matches the query 402. For each software package 102 represented in the database, there is a software package embedding 124 and functionality embeddings 120 of respective functionality clusters 118 into which at least the code blocks 104 of the software package 102 have been clustered.

A distance score 502 between the query embedding 406 and the software package embedding 124 of each software package 102 is generated (504). Similarly, the distance scores 506 between the query embedding 406 and the functionality embeddings 120 of the functionality clusters 118 of each software package 102 are respectively generated (508). The distance score 502 between the query embedding 406 and a software package embedding 124 (or a functionality embedding 120) may be calculated by applying a cosine similarity score function to the vectors of the embeddings 406 and 124 (or 120).

For the functionality clusters 118 of each software package 102, the weighted sums 516 of the distance score 502 for the software package 102 and the distance scores 506 for the clusters 118 are respectively calculated (512). That is, for a given functionality cluster 118 of a given software package 102, the weighted sum 516 of the distance score 502 between the query embedding 406 and the software package embedding 124 of that package 102 and the distance score 506 between the query embedding 406 and the functionality embedding 120 of that functionality cluster 118 is calculated.

A distance score 502 for a software package 102 and a distance score 506 for a functionality cluster 118 of that package 102 may be weighted in the resulting sum 510 in a number of different ways. For example, to bias the search towards identifying a relevant software package 414 over identifying a relevant functionality cluster 514, the distance score 502 may be accorded a higher weight in the sum 510 than the distance score 506. By comparison, to bias the search towards identifying a relevant cluster 514 over identifying a relevant package 414, the distance score 506 may be accorded a higher weight than the distance score 502.

The relevant functionality cluster 514 is then selected (516) as the functionality cluster 118 of any software package 102 that has the highest (or lowest) weighted sum 510. The relevant software package 414 is then identified (518) as the software package 102 that includes the functionality cluster 118 that has been selected as the relevant functionality cluster 514. In the process 500, therefore, just functionality embeddings 120 and software package embeddings 124 are considered, and not the individual code block embeddings 110 (or documentation string embeddings 112), resulting in a more scalable and performant process than if such embeddings 110 (and 112) were considered.

Figure 5B:
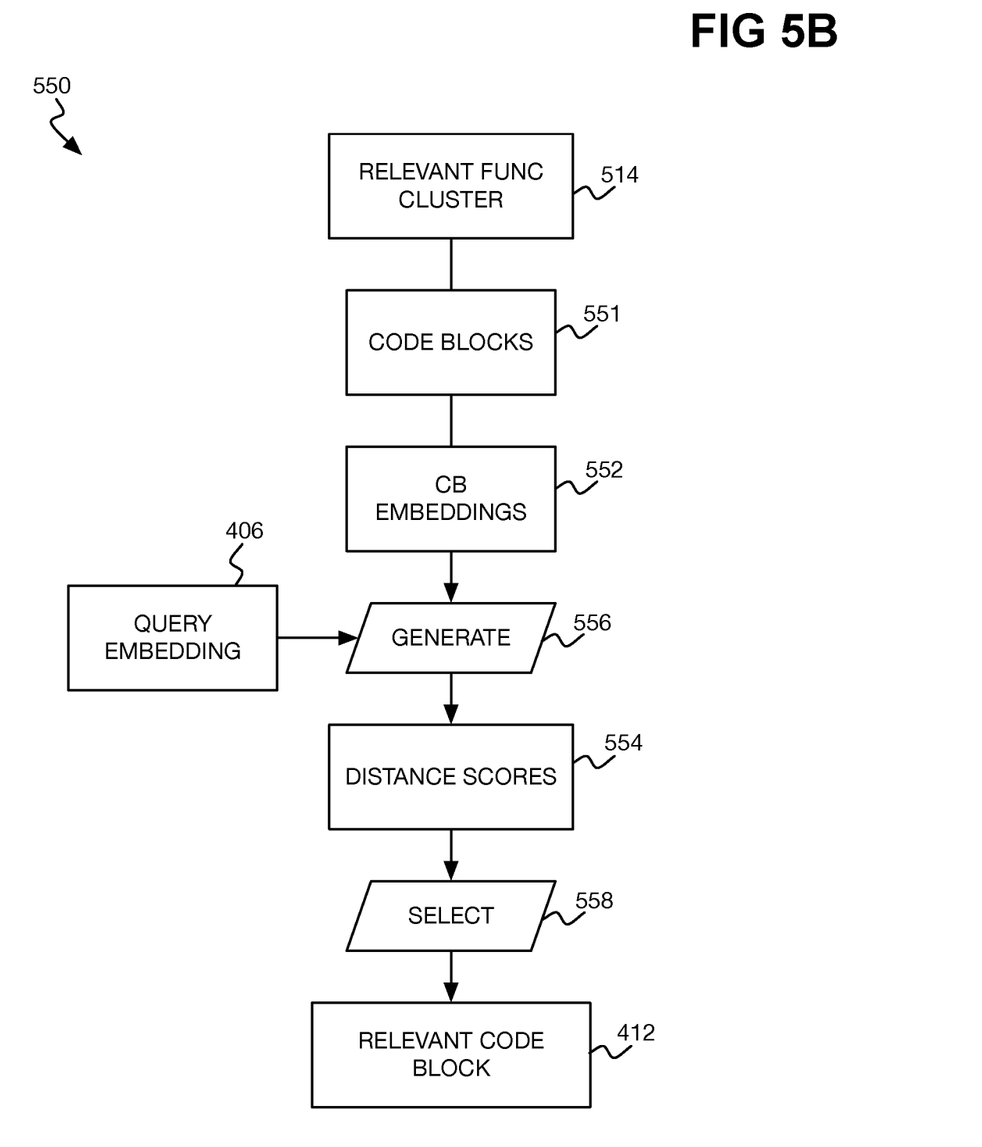

FIG. 5B shows a process 550 for then querying the database using the query embedding 406 to identify the relevant code block 412 within the relevant software package 414 that has been identified. For the relevant software package 414 represented in the database, there are code blocks 551 having code block embeddings 552. The code blocks 551 are the code blocks 104 of the software package 102 identified as the relevant software package 414. The code block embeddings 552 are the code block embeddings 110 of these code blocks 104.

Distance scores 554 between the query embedding 406 and the code block embeddings 552 are respectively generated (556). The distance score 554 between the query embedding 406 and a code block embedding 552 may be calculated as the cosine similarity score between the vectors of the embeddings 406 and 552. The relevant code block 412 is selected (558) as the code block 551 of the relevant software package 414 that has the highest (or lowest) distance score.

In the process 550, therefore, just code block embeddings 110 of the code blocks 104 of the software package 102 identified as the relevant software package 414 are considered, and not the code block embeddings 110 of the code blocks 104 of any other software package 102, resulting in a more scalable and performant process than if such code block embeddings 110 were considered. While the process 550 has been described in relation to the code block embeddings 552 of the code blocks 551 of the relevant software package, but can also be performed in relation to the documentation string embeddings 112 of the documentation strings 106 for these code blocks 551.

Furthermore, the processes 500 and 550 together result in more accurate identification of the relevant code block 412, because rather than considering just code block embeddings 110, the software package embedding 124 and the functionality embeddings 120 are also considered. That is, the process 500 of FIG. 5A in particular initially selects the relevant functionality cluster 514 to identify the relevant software package 414. The process 550 of FIG. 5B then selects the relevant code block 412 within that software package 414.

Figure 6:
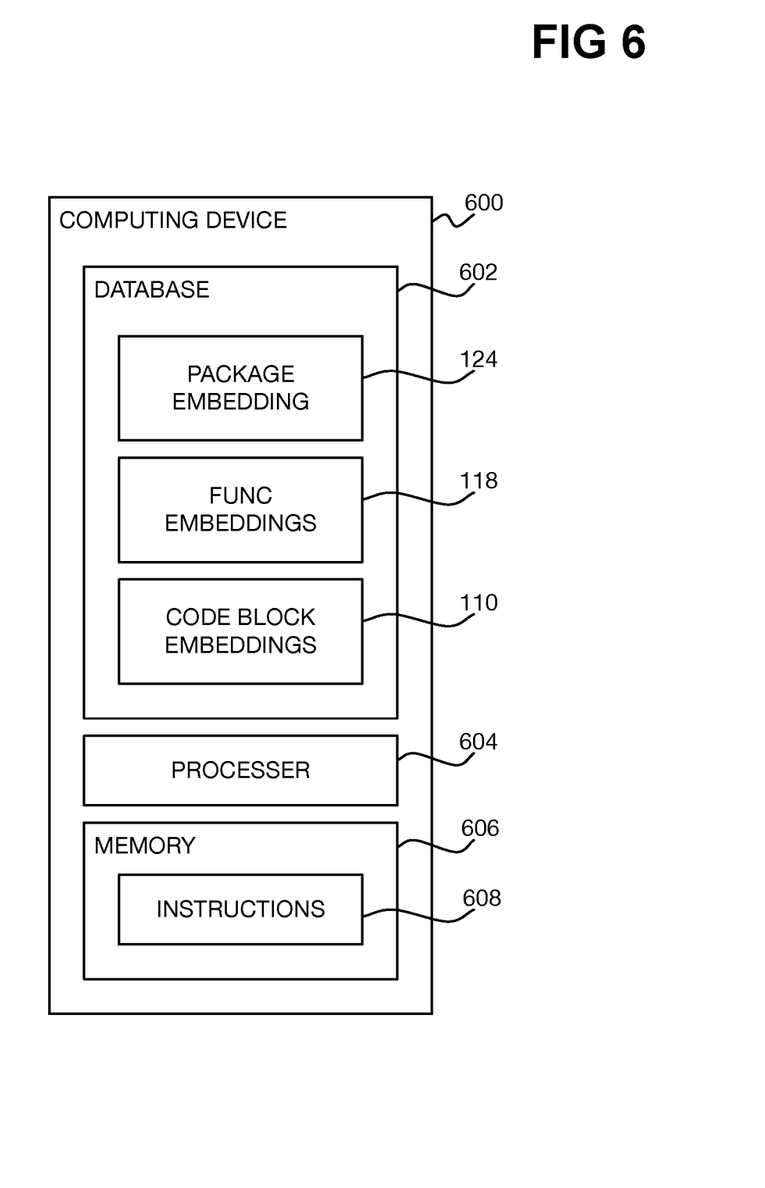
FIG. 6 is a diagram of an example computing device.

FIG. 6 shows an example computing device 600. The computing device 600 may be a desktop, laptop, or server computer. The computing device 600 includes a database 602, a processor 604, and a memory 606 storing instructions 608. The memory 606 is an example of a non-transitory computer-readable data storage medium. The instructions 608 are executable by the processor 604 to perform processing to perform the processes that have been described, as methods.

For each software package 102 represented in the database 602, the database 602 stores the software package embedding 124 for the software package 102, the functionality embeddings 120 of the functionality clusters 116 into which the code blocks 104 of the package 102 have been clustered, and the code block embeddings 110 of these code blocks 104. The database 602 may also store the documentation string embeddings 112 of the documentation strings 106 of these code blocks 104.

Techniques have been described for identifying a relevant code block within a relevant software package for a query. The techniques can accurately identify a relevant code block for a query, because they also consider both the software packages themselves and the functionalities of the code blocks (via the functionality clusters into which the code blocks have been clustered). Furthermore, the techniques do not examine each code block of each software package, but just the code blocks of the software package that has been identified as being relevant, resulting in improved scalability and performance.

We claim:
1. A method comprising:
for each of a plurality of software packages:
generating, by a processor, code block embeddings respectively representing a plurality of code blocks of the software package, wherein:
the software package comprises source code in a computer programming language that is interpretable or compilable for execution by a computing device, the plurality of code blocks each correspond to a function, class, object, or method of the source code that is individually reusable in development of a software project, and the code block embeddings each comprise a vector of programming language syntax present in the source code of a corresponding one of the elesk the blocks represented by the code block embedding;

clustering, by the processor, the code block embeddings into functionality clusters;

generating, by the processor, functionality, wherein:
the functionality embeddings each represent a corresponding one of the functionality clusters,
the functionality embeddings each comprise a vector, and
each functionality embedding is generated by combining the vectors of the code block embeddings of the functionality cluster into the vector of the functionality embedding representing the corresponding one of the functionality clusters that is represented by the functionality embedding;

generating, by the processor, a software package embedding representing the software package, using either the functionality embeddings or both the functionality embeddings and the code block embeddings, wherein:
the software package embedding comprises a vector, and
the software package embedding is generated at least by combining the vectors of
the functionality embeddings into the vector of the software package embedding;

storing, by the processor, the software package embedding, the functionality embeddings, and the code block embeddings in a database;

generating, by the processor, a query embedding representing a query;

querying, by the processor, the database using the query embedding to identify a relevant code block within a relevant software package for the query; and returning, by the processor, the relevant code block within the relevant software package that has been identified.

2. A non-transitory computer-readable data storage medium storing program code executable by a processor to perform processing comprising, for each of a plurality of software packages:

generating code block embeddings respectively representing a plurality of code blocks of the software package, wherein:
the software package comprises source code in a computer programming language that is interpretable or compilable for execution by a computing device,
the plurality of code blocks each correspond to a function, class, object, or method of the source code that is individually reusable in development of a software project, and
the code block embeddings each comprise a vector of programming language syntax present in the source code of a corresponding one of the clock blocks represented by the code block embedding;

clustering the code block embeddings into functionality clusters;

generating functionality embeddings, wherein:
the functionality embeddings each represent a corresponding one of the functionality clusters,
the functionality embeddings each comprise a vector, and
each functionality embedding is generated by combining the vectors of the code block embeddings of the functionality cluster into the vector of the functionality embedding representing the corresponding one of the functionality clusters represented by the functionality embedding;

generating a software package embedding representing the software package, using either the functionality embeddings or both the functionality embeddings and the code block embeddings, wherein:
the software package embedding comprises a vector, and
the software package embedding is generated at least by combining the vectors of the functionality embeddings into the vector of the software package embedding; and storing the software package embedding, the functionality embeddings, and the code block embeddings in a database queryable to identify a relevant code block within a relevant software package for a query.

3. The non-transitory computer-readable data storage medium of claim 2, wherein the processing further comprises:
receiving the query;
generating a query embedding representing the query;
querying the database using the query embedding to identify the relevant code block within the relevant software package for the query; and
returning the relevant code block within the relevant software package that has been identified.

4. The non-transitory computer-readable data storage medium of claim 3, wherein querying the database using the query embedding comprises:
for each software package, applying a distance function between the query embedding and the software package to generate a distance score for the software package;
for each functionality cluster of each software package, applying the distance function between the query embedding and the functionality embedding representing the functionality cluster to generate a distance score for the functionality cluster;
for each functionality cluster of each software package, calculating a weighted sum of the distance score for the functionality cluster and the distance score for the software package of which the functionality cluster is part; and
selecting the functionality cluster for which the weighted sum is highest or lowest, the software package of which the selected functionality cluster is part identified as the relevant software package.

5. The non-transitory computer-readable data storage medium of claim 4, wherein querying the database using the query embedding comprises:
for each code block embedding clustered into the selected functionality cluster, applying the distance function between the query embedding and the code block embedding to generate a distance score for the code block of the relevant software package that the code block embedding represents; and
selecting the code block for which the distance score is highest or lowest, as the relevant code block within the relevant software package.

6. The non-transitory computer-readable data storage medium of claim 5, wherein the distance function is applied between the query embedding and each code block embedding clustered into the selected functionality cluster, and not for the code block embeddings clustered into any other of the functionality clusters.

7. The non-transitory computer-readable data storage medium of claim 1, wherein the processing further comprises, for each software package:
   extracting the plurality of code blocks from the software package.

8. The non-transitory computer-readable data storage medium of claim 1, wherein extracting the plurality of code blocks from the software package comprises:
   parsing the software package for functions, methods, objects, and classes of the software package as the plurality of code blocks.

9. The non-transitory computer-readable data storage medium of claim 1, wherein extracting the plurality of code blocks from the software package comprises:
   retrieving a dataset into which the software package has been organized into rows and columns, the rows corresponding to the plurality of code blocks and the columns including a source code column corresponding to a string specifying a function, method, object, or class; and
   for each row, extracting the source code column as one of the plurality of code blocks.

10. The non-transitory computer-readable data storage medium of claim 1, wherein generating the code block embeddings representing the plurality of code blocks comprises:
    using a model, vectorizing each code block into a vector, as the code block embedding representing the code block.

11. The non-transitory computer-readable data storage medium of claim 2, wherein clustering the code block embeddings into the functionality clusters comprises:
    using a same or different clustering technique a plurality of times to cluster the code block embeddings into the functionality clusters, where each time the code block embeddings are clustered into a different number of the functionality clusters;
    computing a score to evaluate each time the code block embeddings have been clustered; and
    selecting the different number of the functionality clusters corresponding to the time yielding a highest score.

12. The non-transitory computer-readable data storage medium of claim 2, wherein generating the functionality embeddings respectively representing the functionality clusters comprises:
    for each functionality cluster, combining the code block embeddings clustered into the functionality cluster, as the functionality embedding representing the functionality cluster.

13. The non-transitory computer-readable data storage medium of claim 2, wherein the processing further comprises, for each software package:
    for the plurality of code blocks of the software package that have documentation strings, respectively extracting the documentation strings;
    generating documentation string embeddings respectively representing the documentation strings; and
    for each of the plurality of code blocks that have the documentation strings, combining a code block embedding representing a code block with the documentation string embedding representing the documentation string of the code block to refine the code block embedding representing the code block.

14. The non-transitory computer-readable data storage medium of claim 1, wherein the processing further comprises, for each software package:
    for the plurality of code blocks of the software package that have documentation strings, respectively extracting the documentation strings;
    generating documentation string embeddings respectively representing the documentation strings;
    clustering the documentation string embeddings into a plurality of additional functionality clusters; and
    generating additional functional embeddings respectively representing the additional functionality clusters.

15. The non-transitory computer-readable data storage medium of claim 1, wherein the processing further comprises, for each software package:
    for the plurality of code blocks of the software package that have documentation strings, respectively extracting the documentation strings; and
    generating documentation string embeddings respectively representing the documentation strings,
    wherein clustering the code block embeddings into the functionality clusters comprises clustering the code block embeddings and the documentation string embeddings into the functionality clusters.

* * * * *